United States Patent [19]

Ishioka et al.

[11] 4,067,489

[45] Jan. 10, 1978

[54] WELDING APPARATUS FOR JOINING COILS OF STRIP STEEL

[75] Inventors: Hiroyuki Ishioka; Yasuo Ise, both of Fukuyama, Japan

[73] Assignee: Nippon Kokan Kabushiki Kaisha, Tokyo, Japan

[21] Appl. No.: 723,479

[22] Filed: Sept. 15, 1976

[30] Foreign Application Priority Data

Sept. 26, 1975 Japan .................................. 50-115559
Sept. 26, 1975 Japan .................................. 50-115560

[51] Int. Cl.² .............................................. B23K 37/04
[52] U.S. Cl. ........................................ 228/5.7; 228/49
[58] Field of Search ................... 228/5.7, 49; 226/19, 226/20

[56] References Cited

U.S. PATENT DOCUMENTS

| | | | |
|---|---|---|---|
| 3,096,919 | 7/1963 | Snyder | 226/20 X |
| 3,247,354 | 4/1966 | Mallett et al. | 228/5.7 X |
| 3,257,060 | 6/1966 | Williams et al. | 228/5.7 X |

*Primary Examiner*—Al Lawrence Smith
*Assistant Examiner*—K. J. Ramsey
*Attorney, Agent, or Firm*—Haseltine, Lake & Waters

[57] ABSTRACT

In a welding machine used on a continuous processing line of strip steel such as a continuous mill line or continuous annealing line for welding the leading end of a following coil to the trailing end of the preceeding coil to provide a continuous section of the strip steel to the line, there is provided a pair of clamping mechanisms for clamping the coil ends to be joined and at least one of the clamping mechanisms is adapted to be movable in the width direction of the strip so as to provide, in combination with a strip width detecting unit, an automatic edge aligning arrangement. In addition to the automatic edge aligning arrangement, there is provided, at the entry end of the welding machine, a coarse edge aligning apparatus which comprises a clamp for clamping the leading end of the following coil and a detecting mechanism for detecting the center of the width of the leading end of the following coil.

6 Claims, 8 Drawing Figures

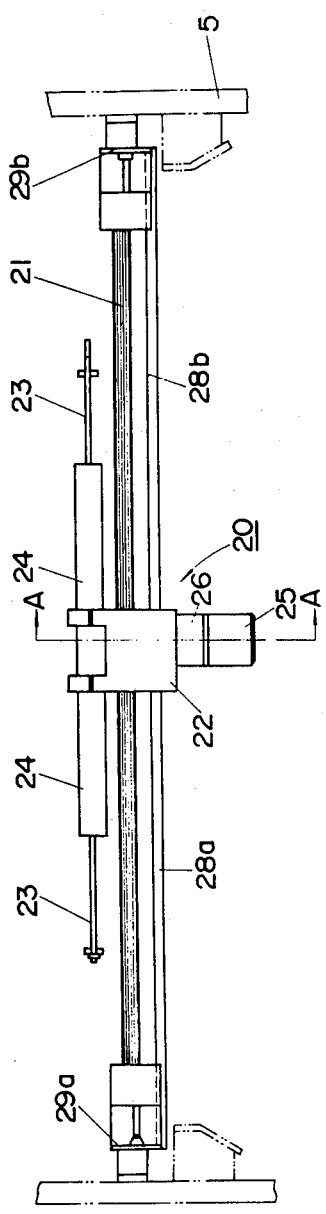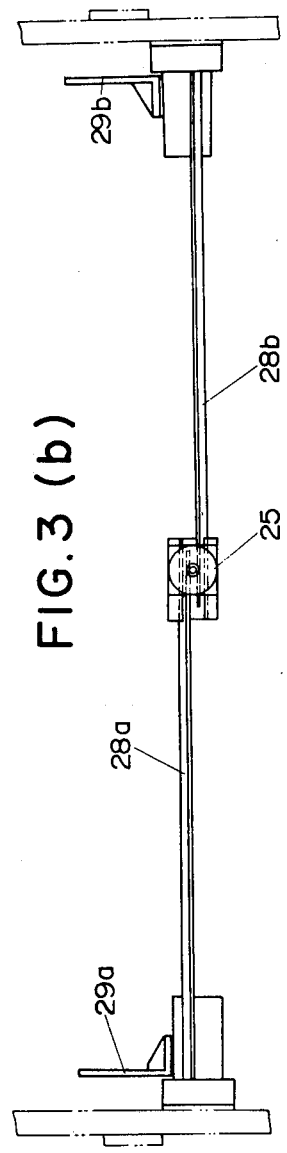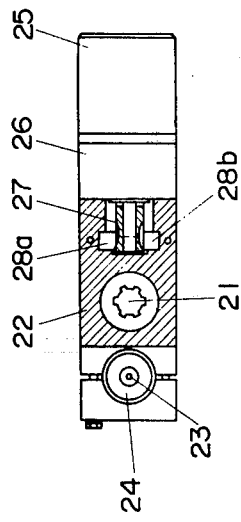

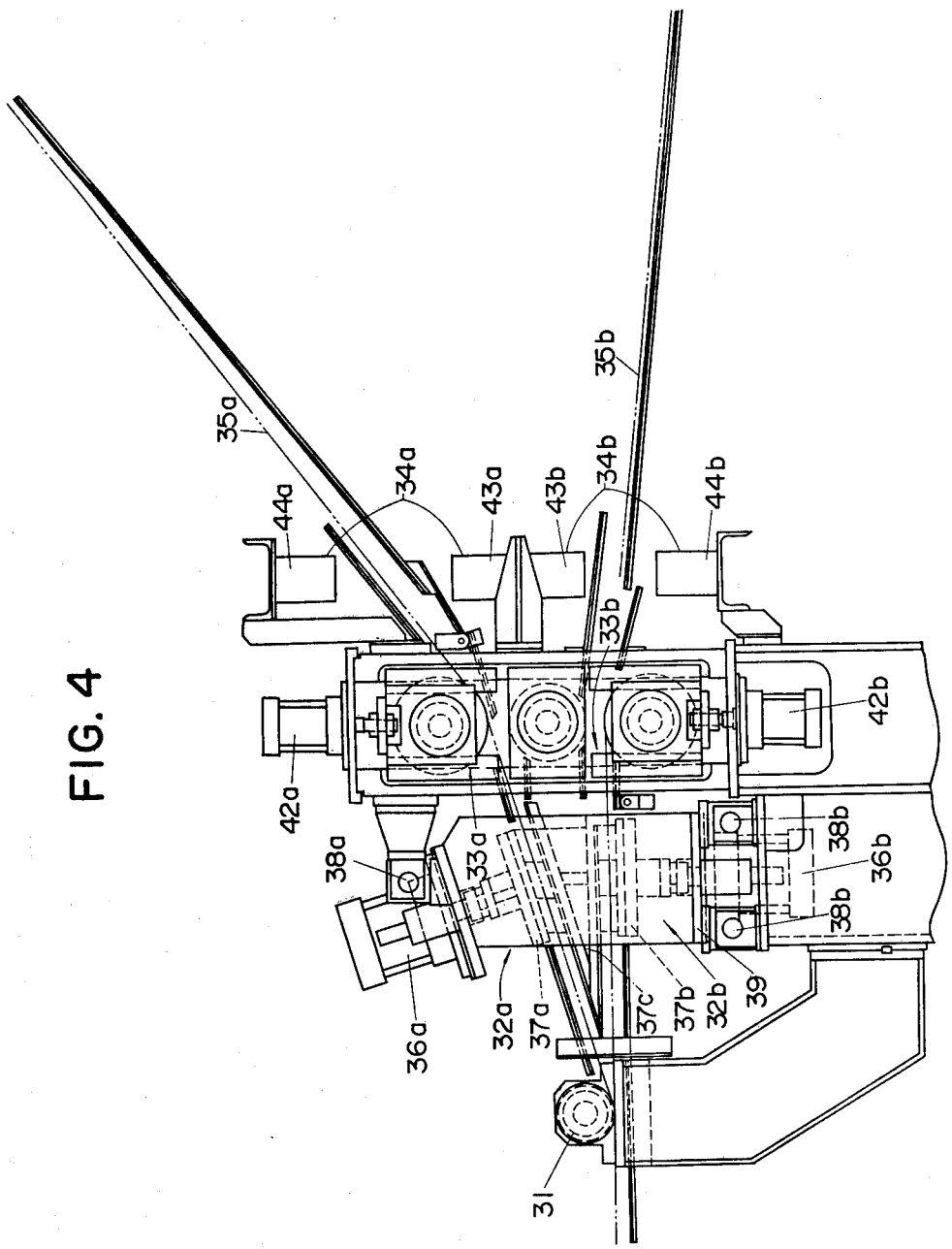

WELDING APPARATUS FOR JOINING COILS OF STRIP STEEL

BACKGROUND OF THE INVENTION

The present invention relates to a welding apparatus of the type used in the entry section of a continuous processing line of strip steel for joining the ends of coils of strip steel, and more particularly the invention relates to an automatic edge aligning arrangement which is designed for use in combination with such welding machine.

Continuous processing lines of strip steel such as continuous mill lines or continuous annealing lines are conventionally operated in such a manner that the steel strip is rapidly fed to the line by one of a plurality of payoff reel units arranged in the entry section of the line to store the strip in the looper on the line, while on the other hand any off-gauge portion in the leading end of another coil steel fed by the following payoff reel unit is cut away and prepared for joining, so that as soon as the trailing end of the said proceeding coil is uncoiled, any off-gauge portion in the trailing end is cut away and the two ends are joined by welding to provide continuous section of the strip steel to the main processing section of the line, thus preventing the occurrence of stopping of the operation of the line.

A disadvantage of the above arrangement is that in the case of a line such as a high speed continuous annealing line for sheet-gauge coil stocks where the storage time of the entry-end looper is not sufficient and the line to which coils are to be fed requires a high degree of accuracy for the edge alignment of the coil ends, it has been the practice to manually accomplish the required edge alignment of the coil ends of strip steel with the resulting difficulty in obtaining the necessary operators and tendency to increase the down time of the entry section of the line.

SUMMARY OF THE INVENTION

With a view to overcoming the foregoing difficulty, it is an object of the present invention to provide a welding machine for joining coils of strip steel incorporating an improved automatic edge aligning arrangement which includes the clamping mechanisms of the welding machine itself to accomplish fine adjusting strip edge alignment, thus greatly contributing toward the full automation of the entry-end process line.

There is thus provided an automatic edge aligning arrangement for coil strip welding machines wherein after the completion of the preparatory trimming operations including the shearing of off-gauge portions, the trailing end of the coil being passed through the line and the leading end of the following coil are respectively clamped by their associated clamping mechanisms with the welding electrodes being positioned therebetween and the coil ends thus clamped by the clamping mechanisms are joined together by welding while the stock amount of the proceeding coil stored in the looper on the line is fed out for the processing purposes. The automatic edge aligning arrangement comprises the clamping mechanisms arranged respectively at the entry and exit parts of the welding machine and at least one of the clamping mechanisms is adapted to be movable in the width direction of the strip steel so as to align the preceeding and following coil ends clamped by the clamping mechanisms in such a manner that their center lines coincide in relation to the width direction. The arrangement further comprises a strip width detecting unit which is provided on the movable clamping mechanism to detect the center line position of the width of the strip steel and thereby to control the amount of movement of the movable clamping mechanism.

It is a further object of the present invention to provide such improved automatic edge aligning arrangement for welding machines of the above type which comprises, in addition to such fine adjusting unit for aligning the center of the proceeding and following coil ends in the strip width direction at the entry side of the welding machine, a plurality of additional clamp units which are equal in number to the payoff reels and arranged in overlapping relation with each other, a pinch roll unit at the entry side of each of the clamp units, said clamp units and the pinch roll units constituting a coarse edge aligning apparatus for moving the clamp units in the width direction of the strip steel in such a manner that the central position of the width of the leading end of the following coil which has been trimmed for preparatory purposes, is aligned with the corresponding central position of the trailing end of the proceeding coil while the preceeding coil is being passed through the line prior to its clamping, and a coarse width detecting unit for controlling the operation of the coarse edge aligning apparatus.

These and further objects and advantages of this invention will become apparent from the following more detailed description of an illustrative embodiment of the invention, which will now be given in conjunction with the accompanying drawings.

BRIEF DESCRIPTION OF THE DRAWINGS

FIG. 3a shows an embodiment of a strip width detecting unit in plan view, FIG. 3b is a front view thereof, FIG. 3c is an enlarged view taken along line A—A in FIG. 3a, FIG. 4 is a partial sectional view of a coarse edge aligning apparatus provided at the entry end of the welding machine taken along the line of the processing line.

DESCRIPTION OF THE PREFERRED EMBODIMENTS

Figure 1:
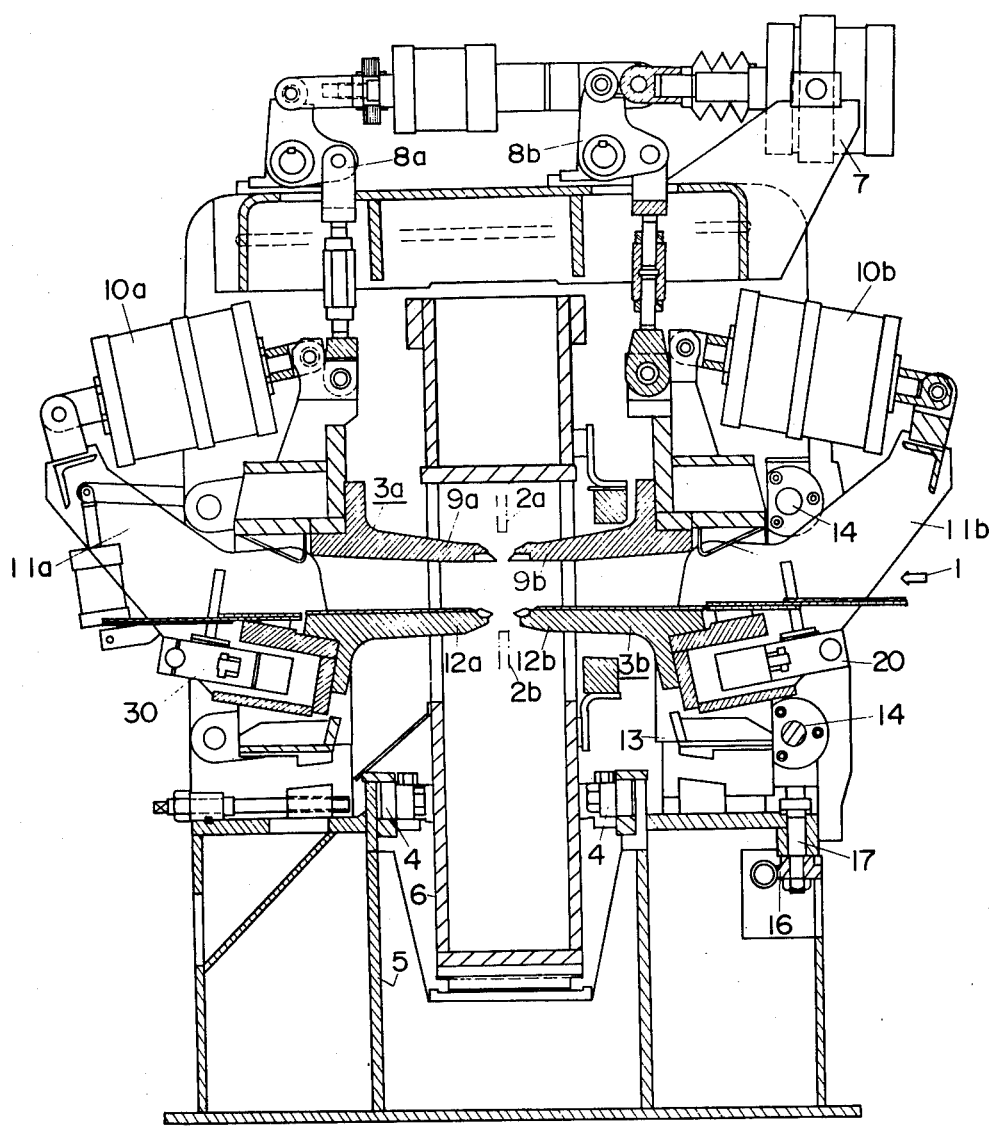
FIG. 1 is a longitudinal sectional view of an entire welding machine according to an embodiment of the invention taken along the line of the processing line.

In FIG. 1 showing a welding machine according to an embodiment of this invention, arrow 1 indicates the direction of travel of the strip steel fed to a continuous processing line from payoff reels, and the welding machine is provided with a pair of clamping mechanisms 3a and 3b arranged in front and back of a pair of welding electrodes 2a and 2b which are arranged vertically on opposite sides of the line. The welding electrodes 2a and 2b are mounted on a holder 6 which is pivotally attached to a frame 5 by rollers 4 so that the coil ends can be welded together in the width direction by the pivotal movement of the electrode holder 6. The clamping mechanisms 3a and 3b include upper clampers 9a and 9b which are respectively moved vertically through link mechanisms 8a and 8b by a common cylinder unit 7 and lower clampers 12a and 12b which are respectively pivoted through operating levers 11a and 11b by separate cylinder units 10a and 10b so that the head edges of the upper clampers 9a and 9b and the lower clampers 12a and 12b are opened and closed. One of these clamping mechanisms which in the illustrated embodiment is the entry clamping mechanism 3b, is adapted to be movable in the width direction of the strip steel, so that with the following coil end clamped by the upper and lower clampers 9b and 12b, the clamping mechanism 3b is moved in the width direction of the strip to position the following coil end in such a manner that its center line is aligned with that of the preceeding coil end which is clamped by the exit clamping mechanism 3a. Of course, the exit clamping mechanism 3a may be made movable in place of the entry clamping mechanism 3b or alternately both of these clamping mechanisms may be made movable.

Figure 2:
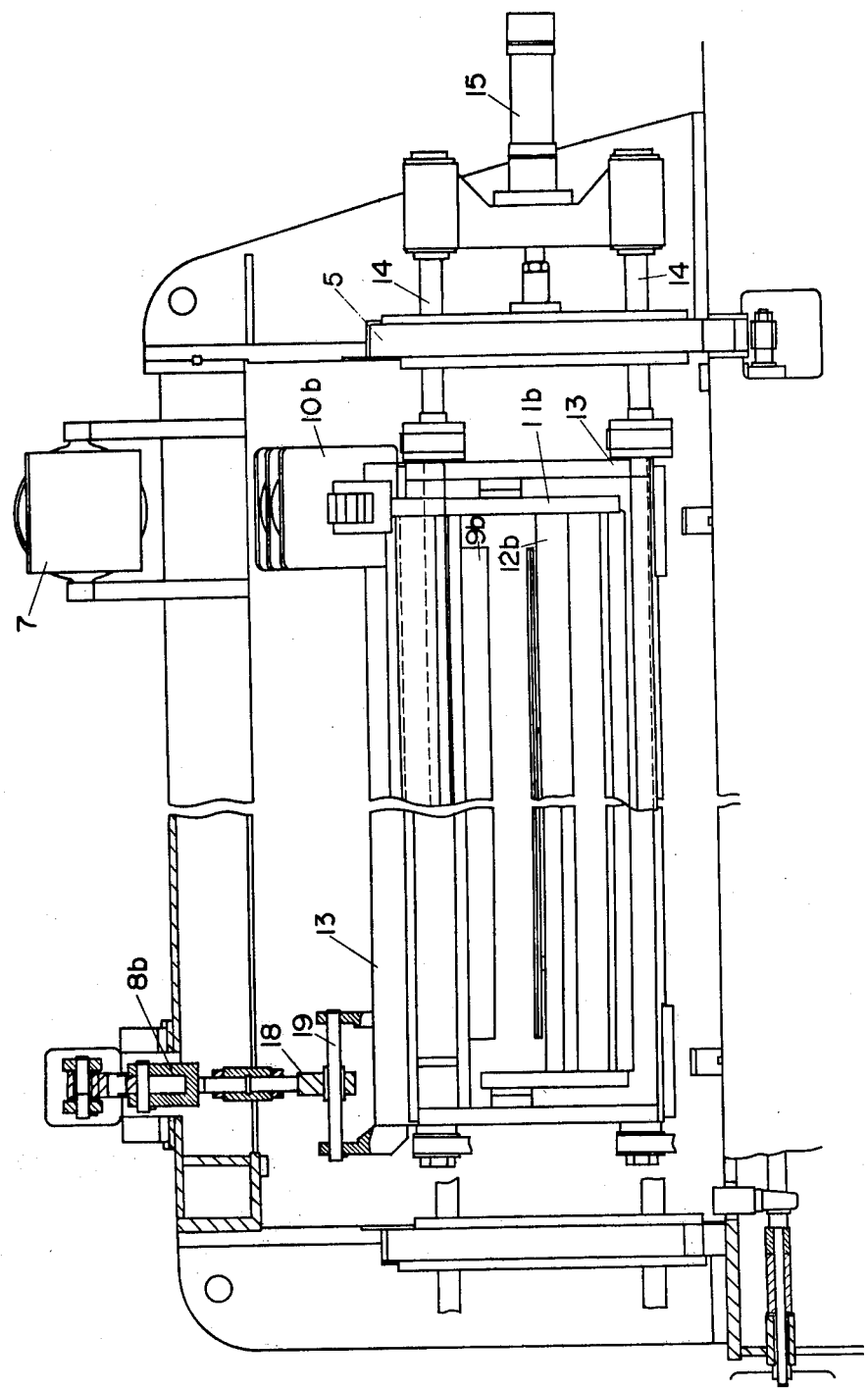
FIG. 2 is a partial sectional view of the welding machine viewed in the direction of the line from the entry side.

In particular, the entry clamping mechanism 3b comprises the upper and lower clampers 9b and 12b, the operating lever 11b and the cylinder unit 10b which are all mounted on a supporting structure 13 mounted on the frame 5 to be slidable in the strip width direction, and the movement of the supporting structure 13 in the width direction of the strip steel is accomplished by connecting one of the ends of shafts 14 which are extended through the sides of the frame 5 and fixedly held in place to a cylinder unit 15 which is connected at one end to the frame 5. To permit the movement of the supporting structure 13 in the width direction of the strip steel, as shown in FIG. 2, the link mechanism 8b for vertically moving the upper clamper 9b has its lifting rod 18 axially slidably mounted on a stay 19 whose ends are fixedly mounted on the supporting structure 13 with a predetermined spacing therebetween.

As shown in detail in FIGS. 3a-3c, the entry clamping mechanism 3b is also provided with a strip width detecting unit 20 which detects and generates, in the form of an electric signal, the central position of the width of the strip steel fed into the clamping mechanism 3b. In other words, as shown in FIG. 3a, the strip width detecting unit 20 includes a detector 22 suspended from a spline shaft 21 which is supported on the frame 5 to extend in the strip width direction and the detector 22 is movable only in the axial direction of the spline shaft 21. The detector 22 includes a differential transformer 24 through which is extended an iron core 23 secured to the frame 5, a motor 25 which is rotatable in either direction and a speed reducing gear 26. In addition, there are provided a pinion 27, a pair of racks 28a and 28b which are in mesh with the pinion 27 and a pair of end plates 29a and 29b which will be pressed against the edges of strip steel. The strip width detecting unit 20 operates as follows.

The motor 25 is operated until the end plates 29a and 29b are pressed against the edges of the strip steel and the differential transformer 24 generates an electric signal representing the position of the detector 22 which is always positioned at the middle point between the end plates 29a and 29b. Thus, the widthwise center position of the strip steel clamped by the clamping mechanism 3b is generated as a position signal of the detector 22 of the strip width detecting unit 20 in relation to a reference point of the frame 5. While, in the illustrated embodiment, the exit clamping mechanism 3a is also provided with a similar strip width detecting unit 30 so that the cylinder unit 15 is controlled by a control unit (not shown) in such a manner that the position signals from the two detecting units become equal to each other, it is needless to say that in the case of a line where the widthwise position of the strip steel at the exit-end clamping mechanism portion or the trailing end of the coil being passed previously through the line is almost the same at all times owing to the specifications of other units or pinch rolls on the line, the same function can be ensured without the provision of the exit-end width detecting unit 30.

Figure 5:
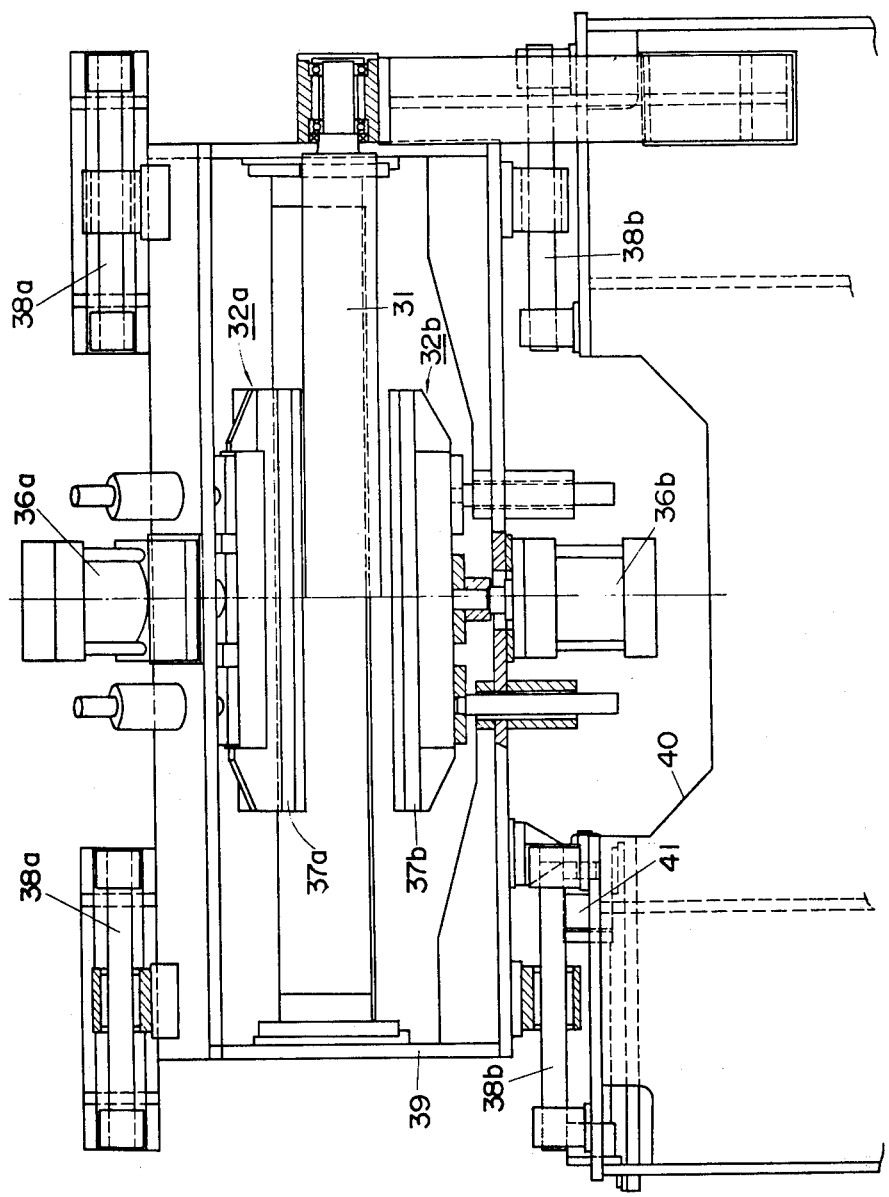
FIG. 5 is a partial sectional view of the coarse edge aligning apparatus viewed in the direction of the line from the exit side.
Figure 6:
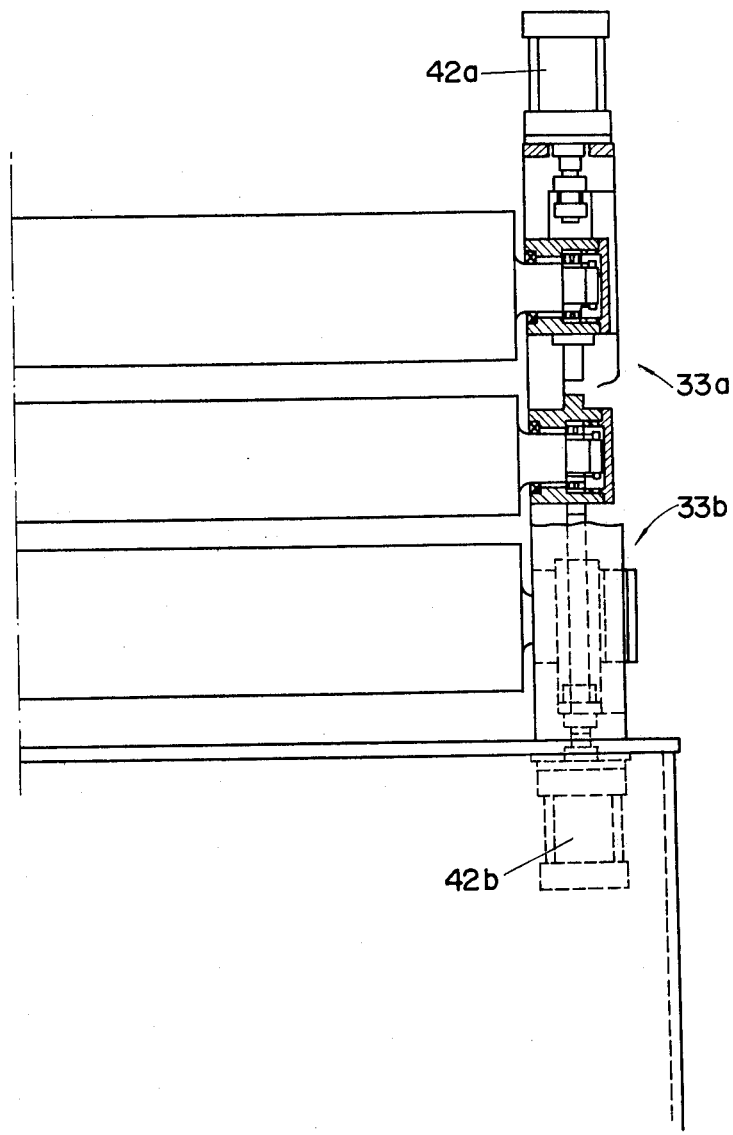
FIG. 6 is a partial sectional view of the coarse edge aligning apparatus viewed from the entry side of the welding machine.

In the illustrated embodiment, a coarse edge aligning apparatus shown in FIGS. 4, 5 and 6 is provided at the entry side from the welding machine constructed as described above. More specifically, two-high clamp units 32a and 32b, two-high pinch roll units 33a and 33b, means for moving these clamp units in the width direction of strip steel and two-high coarse strip width detecting units 34a and 34b are operatively connected to the entry end of the welding machine through a deflector roll 31, and these two groups of units constitute feed lines 35a and 35b for the coil stocks from the two payoff reel units (not shown). The detecting units 34a and 34b are themselves well known in the art and require no detailed explanation to a skilled artisan. It is sufficient to note that each detecting unit includes a light projector and receiver assembly associated with each of the edges of the coil strip in each feeding line as will be described later. If the preceeding coil is being fed through the line 35a, the following coil which has been trimmed for preparatory purposes enters into the line 35b and is brought to the position of the clamping mechanism 32b prior to the welding operation. The pinch roll unit 33b pinches and feeds the leading end of the following coil which has beem trimmed as mentioned earlier to the clamping mechanism 3b at the entry end of the welding machine through the exit clamp units 32b, and the pinching of the strip steel effected by the associated cylinder unit 42b, as shown in FIG. 6, is released as soon as the leading end of the following coil reaches the welding position, after which the leading end of the following coil is clamped by the clamping mechanism 3b.

The upper and lower clamp units 32a and 32b which clamp the strip steel of following coil at a position in front of the entry end of the welding machine, respectively comprise clampers 37a and 37b which are respectively opened and closed by cylinder units 36a and 36b and mounted by means of shafts 38a and 38b, respectively, on a common supporting structure 39 which is movable in the width direction of the strip steel and the movement of the supporting structure 39 is effected by means of a cylinder unit 41 mounted on a base 40 as shown in FIG. 5. The coarse strip width detecting units 34a and 34 b respectively including a pair of light projector and receiver assemblies 43a, 44a and 43b, 44b, respectively are provided at the entry side of the pinch roll units 33a and 33b, respectively, so as to be respectively directed to the side edges of the strip stee. These units constitute an automatic coarse edge aligning apparatus so that when the central position of the following coil strip being conducted through the line 35b, for example, is detected, in response to the resulting electric signal a control unit (not shown) controls and operates through the actuating cylinder unit 41 the clamp unit 32b including the clamper 37b clamping the leading end of the following coil in the width direction of the strip steel.

In the above-described part of the welding machine of this invention, the leading end portion of the following coil which has been subjected to trimming operations including the shearing of off-gauge portions while the preceeding coil was being fed through the line, is clamped by the clamp unit at the entry side of the welding machine and the coarse width aligning operation is effected by the automatic coarse edge aligning apparatus to move the following coil in the width direction thereof and align its widthwise center position with that of the proceeding coil being passed through the line, while on the other hand the proceeding coil is uncoiled until the trailing end portion of the proceeding coil just before the off-gauge portion is payed off thus storing a sufficient amount of the strip in the looper and the off-gauge portion is sheared off at that position by the shear of the welding machine thus rewinding the cut off strip onto the reel for disposal as scrap and the thus prepared trailing coil end is clamped by the clamping mechanism at the exit end of the welding machine. Thereafter, the leading end of the following coil which has been moved to the position of the clamper through the pinch roll unit of the automatic coarse edge aligning apparatus, is moved further by this pinch roll unit into and clamped by the clamping mechanism at the entry end of the welding machine and then either the entry clamping mechanism or the exit clamping mechanism is moved in accordance with the output of the strip width detecting unit in such a manner that the widthwise centers of the two coil ends are aligned with each other. Thereafter, the welding electrodes are pressed against each other to weld the coil ends together.

After the welding has been completed, the clamping mechanisms, the clamp units and the pinch roll units are released altogether so that the leading end of the following coil now connected to the trailing end of the preceeding coil is fed through the line and the continued feeding of the coil strip during the welding operation is ensured by the looper at the entry position of the main process section. While, in the above-described embodiment, the widthwise center of the following coil end is aligned with that of the proceeding coil end instead of using the line center, this is due to the fact that in the case of ordinary coils, the method of aligning the strip coils according to their widthwise positions which are more adaptable to the line and thus ensuring smooth passage of the strip is easier than one in which the strip is passed according to the line center. However, even if the trailing and leading ends of the coils are warped considerably in the case where the strip is passed according to the line center, satisfactory results can still be obtained by the machine of the invention by moving both of the fine adjustment clamping mechanisms of the welding machine so as to effect the required adjustments.

Thus, in accordance with the present invention, the above-described series of operations can be automated in a simple sequence and moreover by providing, if necessary, the coarse edge aligning apparatus of this invention at the entry end of the welding machine on a high speed processing line, the desired aligning can be accomplished more accurately and rapidly thus considerably reducing the down time of the welding machine. Still further, by vitrue of the fact that the desired alignment of the coil ends can be accomplished by means of the clamping mechanisms of the welding machine itself, the provision of any additional equipment for aligning purposes is not needed and thus the length of the line is prevented from becoming undesirably large.

We claim:

1. In a coil strip steel joining welding machine wherein the trailing end of a preceeding coil of strip steel and the leading end of a following coil of strip steel are clamped and joined by welding to provide a continuous section of strip steel, an improvement comprising an automatic edge aligning arrangement comprising: a pair of clamping mechanisms respectively provided at the entry and exit sides of said welding machine, each clamping mechanism including upper and lower clamping members, supporting means supporting at least one of said clamping mechanisms for movement in the width direction of the strip steel; means for moving said movable clamping mechanism to align the center lines of the width of said clamped coil ends with each other; strip width detecting means for detecting the center line position of the width of the strip steel for controlling the amount of movement of said movable clamping mechanism; means for opening and closing the clamping members of said one clamping mechanism including link means comprising a lifting rod and a supporting shaft slidably supporting said lifting rod thereon, said supporting shaft having ends spaced from one another by a predetermined distance and secured to the supporting means.

2. In a coil strip steel joining welding machine wherein the trailing end of a preceeding coil of strip steel and the leading end of a following coil of strip steel are clamped and joined together by welding to provide a continuous section of strip steel, an improvement comprising an automatic edge aligning arrangement comprising: a pair of clamping mechanisms respectively provided at the entry and exit sides of said welding machine, each clamping mechanism including upper and lower clamping members, supporting means supporting at least one of said clamping mechanisms for movement in the width direction of the strip; steel means for moving said movable clamping mechanism to align the center lines of the width of said clamped coil ends with each other; and strip width detecting means for detecting the center line position of the width of the strip steel for controlling the amount of movement of said movable clamping mechanism; said strip width central position detecting means including a differential transformer including an iron core fixedly attached to the frame of said welding machine and extending through said differential transformer, a reversible motor, a speed reduction gear with a output shaft coupled to said motor, a pinion mounted on said output shaft, a pair of displaceable racks meshed with said pinion, and a pair of end plates respectively attached to the outer ends of said pair of racks to be moved relative to one another by rotation of said pinion for contacting the edges of the strip of said clamped coil end, said differential transformer being fixed centrally between said pair of end plates and including means for generating an electrical signal representative of the central position between said end plates.

3. In a coil strip steel joining welding machine wherein the trailing end of a preceeding coil of strip steel and the leading end of a following coil of strip steel are clamped and joined together by welding to provide a continuous section of strip steel, an improvement comprising an automatic edge aligning arrangement comprising: a pair of clamping mechanisms respectively provided at the entry and exit sides of said welding machine, each clamping mechansim including upper and lower clamping members, supporting means supporting at least one of said clamping mechanism for movement in the width direction of the strip steel; means for moving said movable clamping mechanism to align the center lines of the width of said clamped coil ends with each other; strip width detecting means for detecting the center line position of the width of the strip steel for controlling the amount of movement of said movable clamping mechanism; a coarse edge aligning means including a deflector roll mounted in front of the entry side of said welding machine, a pair of clamp means disposed adjacent said deflector roll and arranged one above the other, means for moving said clamp means in the width direction of the strip steel, a pair of pinch roll units arranged one above the other, a pair of coarse strip width detecting means arranged one above the other, and a pair of feeding lines for two coils of strip steel.

4. Welding machine according to claim 3, wherein said clamp means selectively clamp the leading end of the following coil of strip steel, and wherein said clamp means are mounted as a unit on a supporting structure movable over the base of said welding machine.

5. Welding machine according to claim 3, wherein the pinch roll units of said coarse edge aligning apparatus are positioned to selectively feed the leading end of the following coil of strip steel to said clamping mechanism at the entry end of said welding machine.

6. Welding machine according to claim 3, wherein each of said coarse strip width detecting means includes a pair of light projector and receiver assemblies directed towards the side edges of the associated one of said feeding lines.

* * * * *